United States Patent
Cummings et al.

(10) Patent No.: US 9,323,702 B2
(45) Date of Patent: Apr. 26, 2016

(54) INCREASING COVERAGE OF DELAYS THROUGH ARBITRATION LOGIC

(71) Applicant: International Business Machines Corporation, Armonk, NY (US)

(72) Inventors: David W. Cummings, Round Rock, TX (US); Jonathan R. Jackson, Austin, TX (US); Guy L. Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 13/686,095

(22) Filed: Nov. 27, 2012

(65) Prior Publication Data

US 2014/0149622 A1    May 29, 2014

(51) Int. Cl.
*G06F 13/362*     (2006.01)
*G06F 11/22*      (2006.01)
*G06F 17/50*      (2006.01)

(52) U.S. Cl.
CPC ............ *G06F 13/3625* (2013.01); *G06F 11/22* (2013.01); *G06F 17/5022* (2013.01); *G06F 2217/10* (2013.01)

(58) Field of Classification Search
CPC .. G06F 13/3625; G06F 17/5022; G06F 11/22
See application file for complete search history.

(56) References Cited

U.S. PATENT DOCUMENTS

| | | | |
|---|---|---|---|
| 6,073,194 A | 6/2000 | Lowe | |
| 6,110,218 A | 8/2000 | Jennings | |
| 6,505,265 B1 * | 1/2003 | Ishikawa et al. | 710/113 |
| 7,409,608 B1 * | 8/2008 | Ferrucci et al. | 714/724 |
| 7,548,841 B2 | 6/2009 | Terashima et al. | |
| 7,739,633 B2 | 6/2010 | Ahmad et al. | |
| 7,752,369 B2 * | 7/2010 | Kailas et al. | 710/244 |
| 8,112,263 B2 | 2/2012 | Terashima et al. | |
| 2003/0097248 A1 * | 5/2003 | Terashima et al. | 703/28 |
| 2010/0138839 A1 * | 6/2010 | Bekooij et al. | 718/102 |
| 2012/0317322 A1 * | 12/2012 | Chirca et al. | 710/244 |

* cited by examiner

*Primary Examiner* — Nimesh G Patel
(74) *Attorney, Agent, or Firm* — Steven L. Bennett; Jack V. Musgrove

(57) ABSTRACT

In the verification of an integrated circuit design having arbitration logic which controls access from a plurality of requesters to a shared resource, an arbitration stall simulation mechanism selects one or more of the requesters for an extended stall procedure, and when a global counter expires, applies stalls having controlled durations to the selected requesters. The controlled durations can be randomly generated time periods within a preset range. The number of requesters subjected to the extended stall procedure can be randomly selected based on a predetermined percentage of requesters to stall. Local (requester-specific) code can perform the stalls for respective requesters using a stall duration inputs. The requester-specific codes can carry out the stalls using application program interface calls to override respective arbiter inputs from the requesters.

25 Claims, 5 Drawing Sheets

INCREASING COVERAGE OF DELAYS THROUGH ARBITRATION LOGIC

BACKGROUND OF THE INVENTION

1. Field of the Invention

The present invention generally relates to computer systems, and more particularly to a method of handling competing requests for data processing resources using arbitration.

2. Description of the Related Art

In the early days of computing, system designs were relatively simple with components essentially connecting directly to their necessary data processing resources. For example, the earliest computers used only a single processor which directly accessed a memory bank and peripheral devices such as a keyboard and display. Because the various resources were dedicated to use by a single component, there was no concern with device contention wherein multiple components might attempt to simultaneously access a single resource. Modern computer systems, however, rely on an increasing number of components which must compete for shared resources. For example, state-of-the-art systems now utilize multiple processors which must vie for access to system memory blocks residing in shared memory caches. If two or more processors issue contemporary requests (read or write operations) which access the same memory block, care must be taken to ensure the integrity of the value (program instruction or operand data) stored in that memory block. Another useful example is the peripheral component interconnect (PCI) architecture in which input/output devices act as masters to access a communications link (i.e., a PCI bus). Any device on a PCI bus that is capable of acting as a bus master may initiate a transaction with any other device, but only one transaction can be placed on the bus at a time.

These potential conflicts in accessing shared resources are typically handled using arbitration circuitry which serializes the requests, i.e., the arbiter will allow one of the requesters to continue its transaction, while the other requester(s) must wait, according to various arbitration protocols. This arbitration process is generally illustrated in FIG. 1 showing four finite state machines (FSMs) 2a, 2b, 2c, 2d which may attempt to access a shared resource 6 from time to time. Instead of directly accessing shared resource 6, the FSMs send their requests to arbitration logic 4. Arbitration logic 4 will select one of the competing requests from the FSMs and issue a grant signal to that winning requester, and will issue wait signals to the other requesters. The other requesters must accordingly retry their transactions in later clock cycles. Different access priorities may be assigned to the requesting devices in order to simplify the decision of the arbiter. If multiple simultaneous requesters have the same access priority, the arbitration logic can sequentially grant access based on numeric identifiers assigned to each requesting device, or using time-slicing methods which attempt to fairly distribute access across the multiple requesters. In the depicted example, arbitration logic 4 grants access for FSM0 2a to shared resource 6 when four requests are received by arbitration logic 4 simultaneously from the four requesters.

When a new computer system is designed, it is important to ensure that the design is going to work properly before proceeding with fabrication preparation for the integrated circuit devices, and their assembly into the finished system. A variety of tests can be performed to evaluate the design, but simulation remains the dominant strategy for functionally verifying high-end computer systems. A design-under-test is driven by vectors of inputs, and states encountered while walking through the sequence are checked for properties of correctness. This process is often performed by software simulation tools using different programming languages created for electronic design automation, including Verilog, VHDL and TDML. The verification process should include simulation of any arbitration logic in the design. Arbitration logic is usually in a critical timing path, and if any requesting devices have logic errors or manufacturing defects, or are driven beyond their design speeds, arbitration may break down. Conventional verification techniques predominantly rely on random traffic patterns to test the operation of arbitration logic.

SUMMARY OF THE INVENTION

The present invention is generally directed to the verification of an integrated circuit design having arbitration logic which controls access from a plurality of requesters to a shared resource, by selecting at least one of the requesters for an extended stall procedure and applying a stall having a controlled duration to the selected requester. The controlled duration can be a randomly generated time period within a preset range. Two or more of the requesters can be selected for the extended stall procedure, in which case the two requesters can be stalled for different durations. In the preferred implementation, a single global counter is used to set a delay between successive stall procedures for multiple selected requesters. First requester-specific code can perform the first stall for the first requester using a first stall duration input, and second requester-specific code performs the second stall for the second requester using a second stall duration input. The requester-specific codes can carry out the stalls using application program interface calls to override respective arbiter inputs from the requesters.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
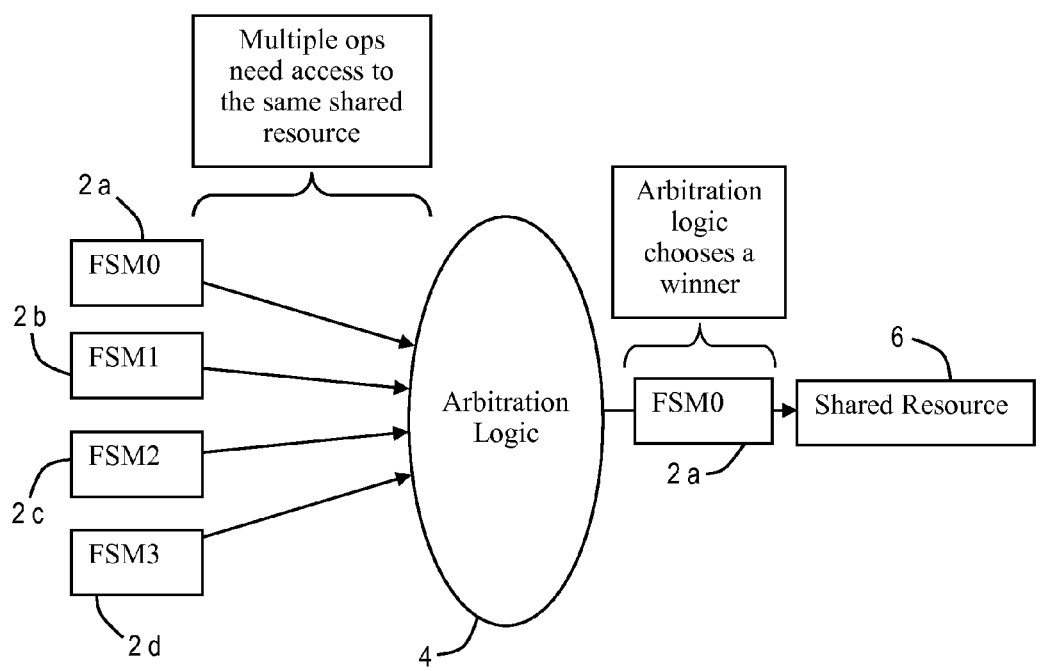
FIG. 1 is a block diagram showing a conventional arbitration process for selecting one of a plurality of devices attempting to access a shared resource.

Conventional verification techniques for arbitration logic which rely on random traffic patterns have several limitations and disadvantages. In random simulation environments, it is difficult to create traffic patterns that could allow acceptance rates through the arbitration logic that significantly vary from normal operation. Usually requesters into the arbiter must support an unbounded delay for their request to be accepted, and it is useful to investigate situations wherein a request is delayed for an extended time period, in order to exposes corner cases in the design that are nearly impossible to otherwise discover. However, the probability of hitting such possible paths through arbiter logic is extremely low using random simulation. Directed testing can be used to artificially reject requests into an arbiter (arbiter stalling), but the number of directed tests required would be extremely high, and the advantages provided by a random simulation environment are lost. Sometimes a shared resource can introduce long delays naturally, but these delays are not sufficient for comprehensive testing. It is particularly desirable to be able to generate an imbalance between all the requesters to a given arbiter. Using the example of FIG. 1, it would be nice to be able to stall FSM0 2a for an extended period, say, 1000 cycles, while allowing the remaining requesters FSM1 2b, FSM2 2c and FSM4 2d to flow through their requests very quickly. Such an imbalance could expose cross FSM dependencies that are not otherwise apparent. It would, therefore, be desirable to devise an improved method of arbitration simulation which could allow such imbalanced requests. It would be further advantageous if the method could enable parameters to be constrained and thereby achieve more directed behavior while still retaining benefits of random testing.

The present invention realizes the foregoing objects by creating a generic, reusable piece of simulation software which can intelligently override internal hardware signals and make it appear to the requesters that the arbiter is blocking one or more requests for random extended periods of time. Using this approach, the designer can directly generate arbitration corner cases which would be practically impossible with conventional techniques, or require mountains of directed testcase work to expose.

Figure 2:
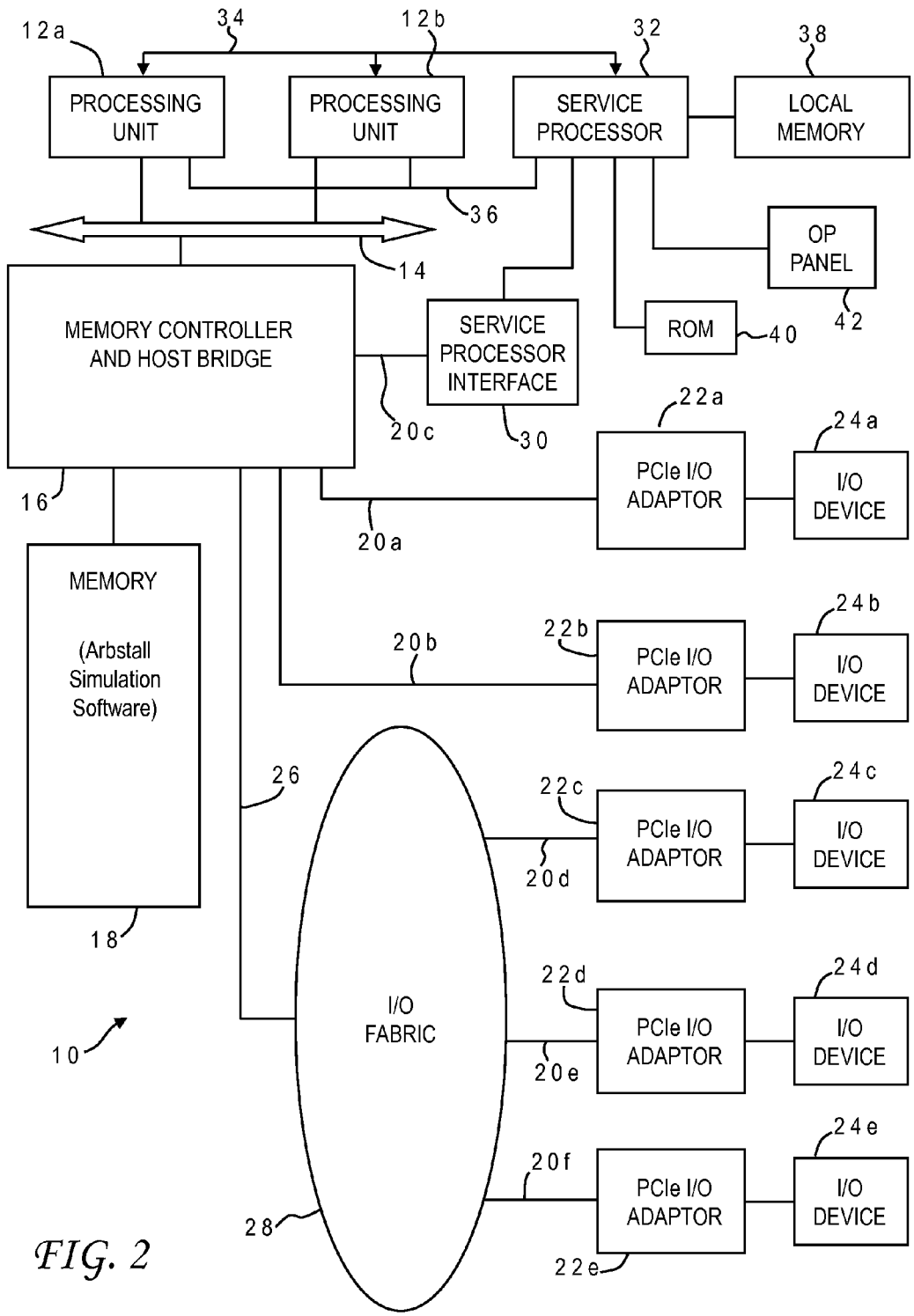
FIG. 2 is a block diagram of a computer system programmed to carry out functional verification of a computer system or subsystem having arbitration logic in accordance with one implementation of the present invention.

With reference now to the figures, and in particular with reference to FIG. 2, there is depicted one embodiment 10 of a computer system in which the present invention may be implemented to carry out the verification of an integrated circuit having arbitration logic. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit verification application of the present invention which includes novel arbitration stall simulation software, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a verification process that uses novel simulation techniques to investigate arbitration logic operation. Accordingly, a program embodying the invention may include conventional aspects of various verification tools, and these details will become apparent to those skilled in the art upon reference to this disclosure.

Figure 3:
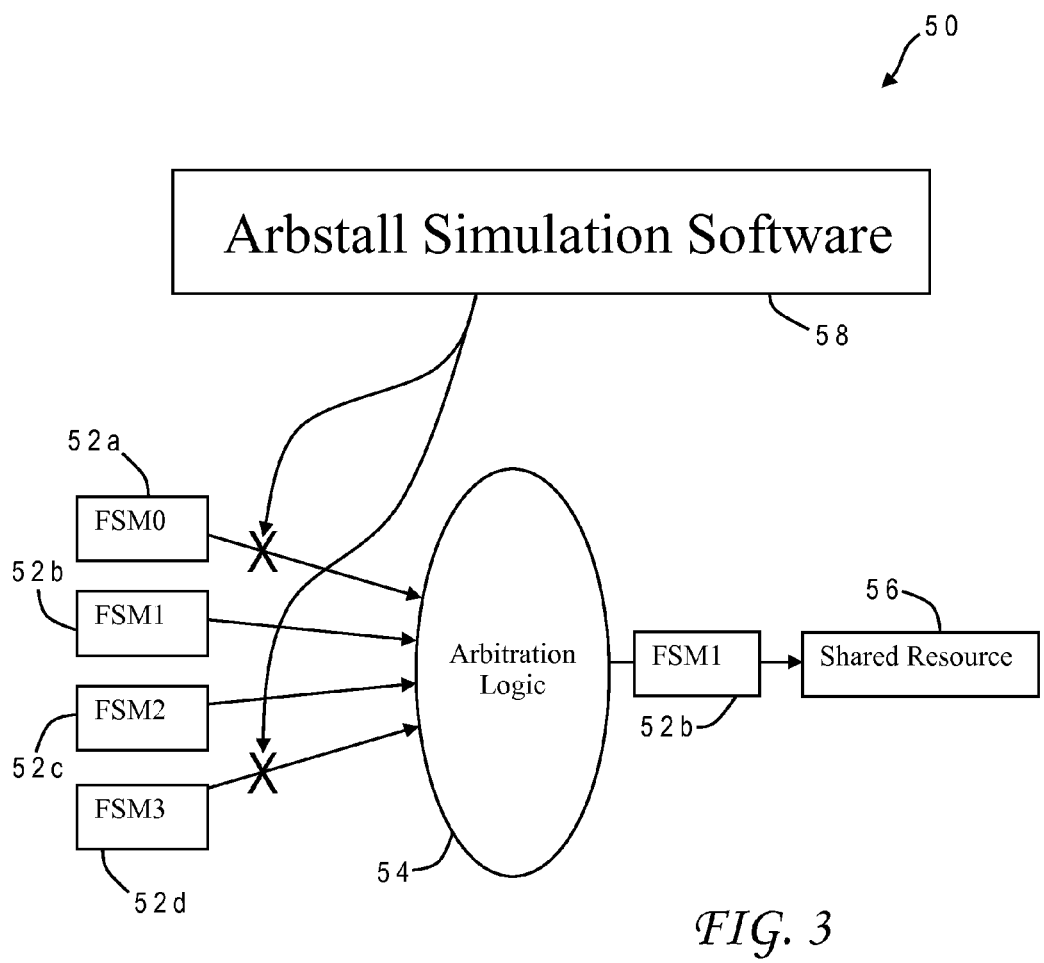
FIG. 3 is a block diagram representing a simulated arbitration process which randomly stalls arbitration requests from one or more requesters in accordance with one implementation of the present invention.

Referring now to FIG. 3, there is depicted one embodiment of a simulated verification environment 50 for an arbitration mechanism of an integrated circuit design in accordance with the present invention. Verification environment 50 includes four finite state machines FSM0 52*a*, FSM1 52*b*, FSM2 52*c* and FSM4 52*d* which issue requests to arbitration logic 54 for access to a shared resource 56. The invention is not limited to any particular type of requesters or shared resources, but in an exemplary implementation the shared resource might be a cache memory, and the requesters might be cache directory circuits such as read/claim, cast-out, or snoop machines. Verification environment 50 will contain other features, not shown, as those skilled in the art will find useful for testing the simulated system, and may further constitute a smaller part of a larger verification environment.

Verification environment 50 also includes arbiter stall (Arbstall) simulation software 58 which randomly stalls arbitration requests from one or more requesters in accordance with one implementation of the present invention. For all request inputs to arbiters in the design, a small subset can be selected to stall. Each request line is then maintained in a logical "low" state for a controlled duration. In the preferred implementation, the stalls are generally within a couple of hundred cycles but allow for a slight chance of thousands of cycles of delay. In the specific example seen in FIG. 3, Arbstall simulation software 58 has introduced artificial stalls for requests from FSM0 52a and FSM3 52d, but is allowing requests from FSM1 52b and FSM2 52c to be handled by the standard operational protocol of arbitration logic 54. Accordingly, when requests would normally be issued by all four requesters simultaneously as part of the simulated verification, only two actually arrive at arbitration logic 54 which then grants access for FSM1 52b to shared resource 56.

Figure 4:
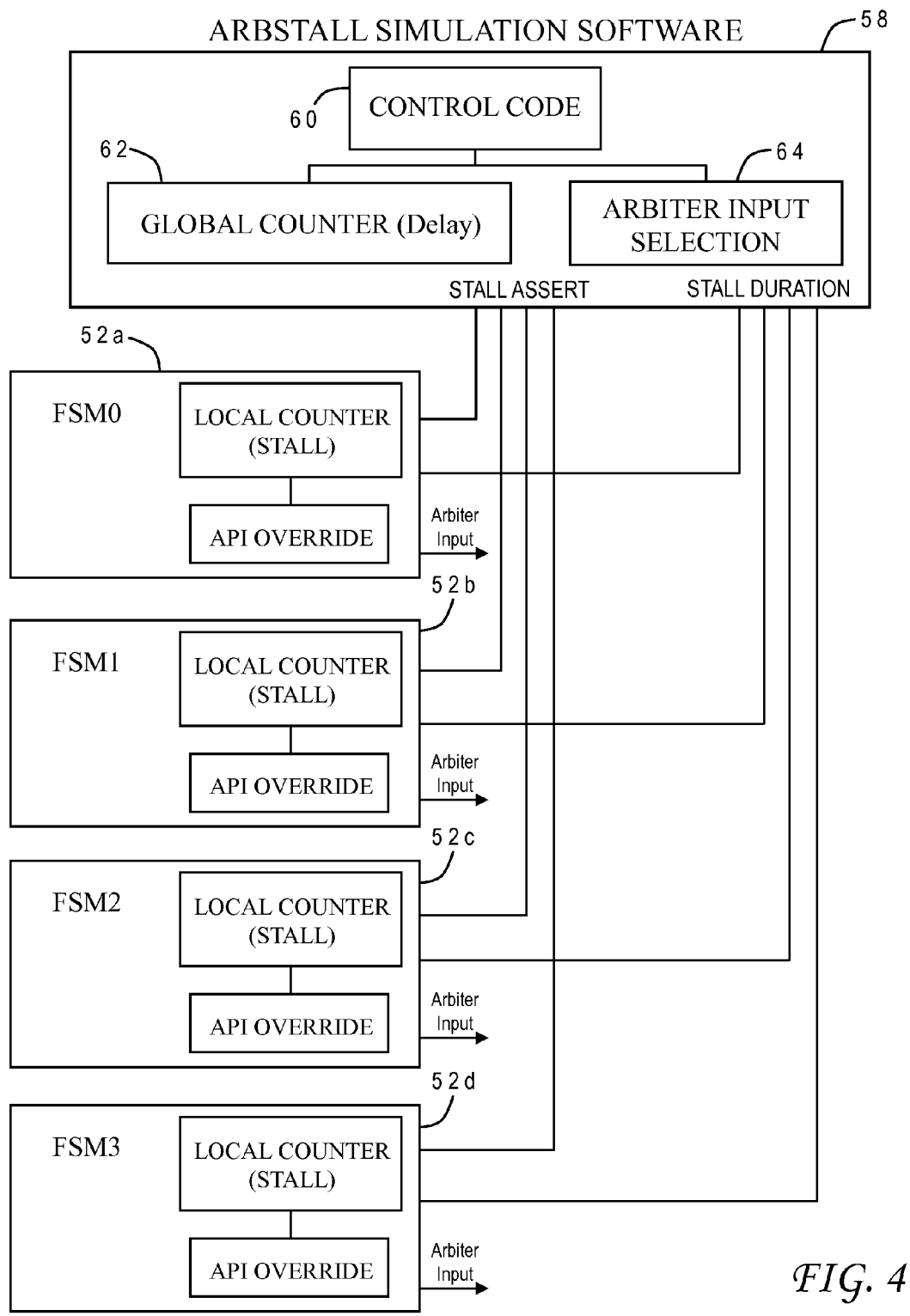
FIG. 4 is a block diagram depicting the interaction of an arbitration stall simulation software unit and local instances of stall control at multiple requesters in accordance with one implementation of the present invention.

FIG. 4 illustrates one manner in which the ArbStall simulation software can be implemented within a tool comprising the verification application. Arbstall simulation software 58 is instantiated for each arbitration unit in the design, and fed a list of arbiter inputs (signal names) to override, e.g., fsm0_request, fsm1_request, etc. The arbiter inputs can be overridden using application program interface (API) calls. In the exemplary embodiment, the API overrides are carried out using instances of local (requester-specific) stall code associated with each requester. The assertion of stalls can be performed by forcing the signals to a value specified in the API call. To deassert the stall, the local Arbstall code can release the signal, i.e., allow the arbiter input to return to the value it is being assigned by the simulated hardware.

Arbstall simulation software 58 can support setting multiple signals to arbitrary values to perform stalls. Stall parameters can be included in or generated by control code 60 to control various aspects of the simulated stalling, such as the delay between stalls, the percentage of inputs to stall, length of stalls, and disabling of stalls. In the illustrative embodiment there is a single delay between stalls of the selected requesters so Arbstall simulation software uses a global counter 62 to maintain this delay. In an alternative implementation separate delay counters could be provided for each requester.

Arbiter input selection 64 of Arbstall simulation software 58 decides which of the requesters will be stalled during the next stall attempt based on the control parameters, e.g., by randomly selecting a number of requesters according to the percentage of inputs to stall. When global counter 62 expires, stall assert signals are activated for each requester selected to stall by arbiter input selection 64. The percentage of inputs to stall could change during a given simulation according to control code 60 so the number of stall assert signals could vary from zero (stalling disabled) to the total number of requesters, i.e., stalling all of the arbiter inputs. In the preferred operation a relatively small subset of the arbiter inputs are selected to stall. For each requester selected to stall, a corresponding stall duration signal is independently set to a stall value as determined by control code 60. The stall durations can be randomly generated time periods (clock cycles) within a preset range, or can be determined according to a preset function. The global counter is also reset to a random duration within the range defined by a control parameter to begin counting down to the next stall attempt.

An input-specific counter is maintained for each requester to control the duration of the stall for that particular arbiter input using the corresponding stall duration signal for that requester. The API override is activated when the stall assert signal becomes active, and is deactivated (i.e., that arbiter input stall is deasserted) when the local counter expires.

Control code 60 may allow for many different possible stall scenarios, such as stalling only one requester versus stalling two requesters at the same time, but there are other scenarios that may be of interest, for example, successive partially-overlapping stalls for multiple requesters, staggering the start times for different arbiter inputs when a stall cycle begins, randomizing the stall durations, grouping arbiter inputs to increase the likelihood they will be stalled at the same time (or nearly the same time), or increasing the likelihood of re-stalling an arbiter input which was just released. More complex stalls handlers (custom code) can optionally be plugged-in to Arbstall simulation software 58 to support complicated arbiters, for example, if a sequence of specific overrides is desired.

Figure 5:
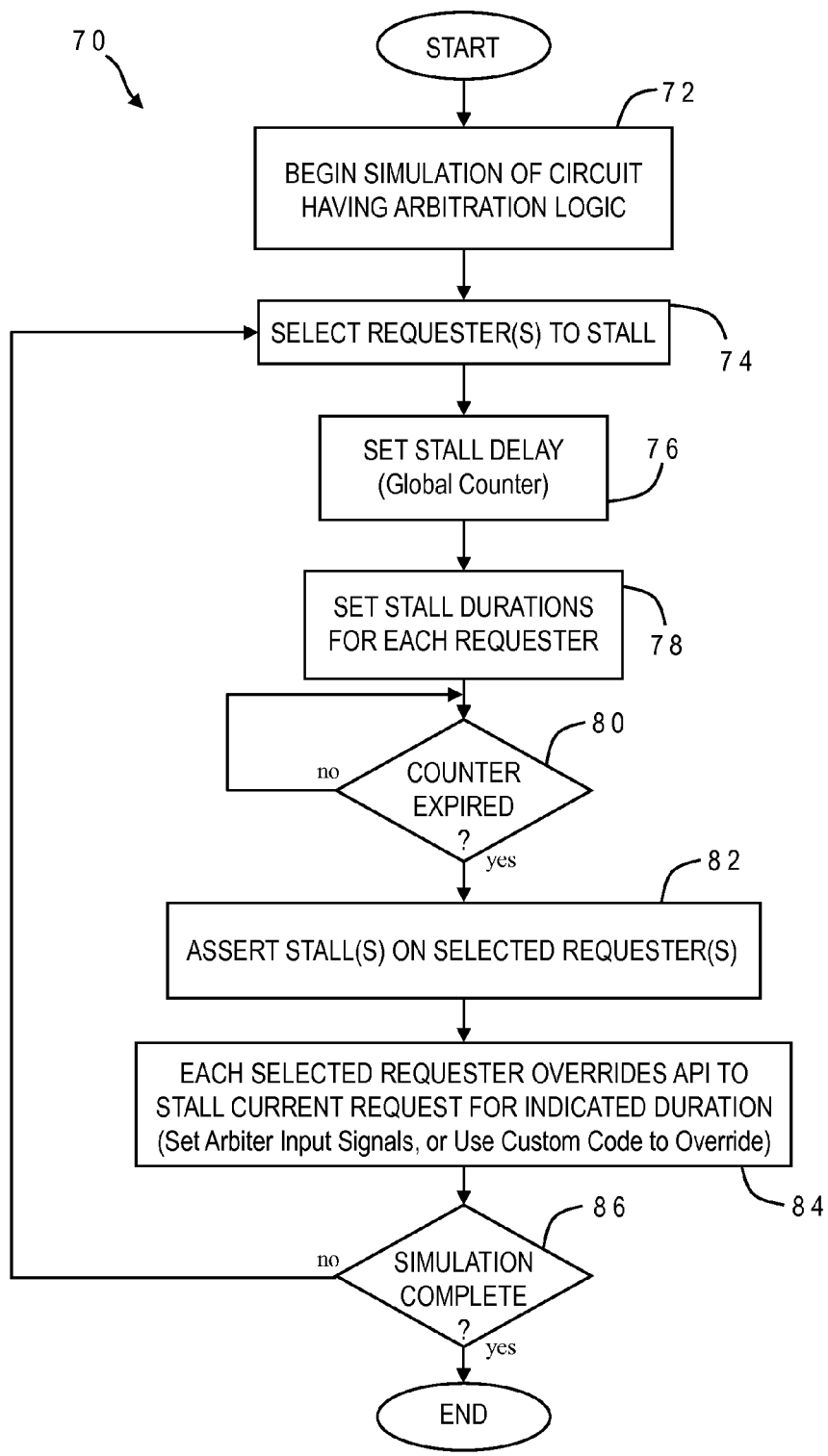
FIG. 5 is a chart illustrating the logical flow for a verification process which includes a simulated arbitration procedure in accordance with one implementation of the present invention.

The invention may be further understood with reference to FIG. 5 which depicts the logical flow for a verification process which uses an arbitration stall mechanism according to the present invention. The process begins with a simulation of an integrated circuit or other electronic device which has arbitration logic (72). A number of the requesters are selected to stall, e.g., randomly according to a predetermined percentage of requesters to stall (74), and the stall delay for the global counter is set (76). Stall durations are also set independently for each selected requester (78). Once the global counter has expired (80), stalls are asserted for each selected requester (82). The local stall code at each selected requester then overrides the API for that arbiter input signal for the indicated duration (84). The stalls are released as the respective local delay counters reach zero; referring back to the example of FIG. 3, FSM0 might get stalled for 10 cycles while FSM3 gets stalled for 250 cycles. For more complicated arbiters, custom code can be used to carry out the stall asserts/deasserts. As the simulation of the circuit proceeds, the state of the arbitration logic is monitored for correctness. The process repeats iteratively at box 74 until the simulation is complete (86).

The present invention thereby provides an improved method of verifying circuitry which relies on arbiter logic, allowing parameters to constrain testing in order to achieve more directed behavior, but still retaining benefits of random testing. This approach protects any surrounding logic from later changes in the arbiter algorithm, since the surrounding logic has been proven robust enough to handle random arbiter delays. The stall mechanism is further independent of the arbitration logic.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of verifying an integrated circuit design having arbitration logic which controls access to a shared resource, comprising:

during a simulation of operation of the integrated circuit design, generating requests from multiple requesters to the arbitration logic for access to the shared resource, by executing first instructions in a computer system;

selecting at least one of the requesters for an extended stall procedure, by executing second instructions in the computer system; and applying a stall having a controlled duration to the selected requester, by executing third instructions in the computer system.

2. The method of claim 1 wherein the controlled duration is a randomly generated time period within a preset range.

3. The method of claim 1 wherein:

said selecting selects two or more of the requesters for the extended stall procedure including at least a first requestor and a second requestor; and said applying applies stalls to both the first requestor and the second requester.

4. The method of claim 3 wherein:
a single global counter is used to set a delay between successive stall procedures of selected requesters; and
said applying applies the stalls when the single global counter expires.

5. The method of claim 3 wherein said applying applies a first stall having a first controlled duration to the first requester and applies a second stall having a second controlled duration to the second requester, the first and second controlled durations being different.

6. The method of claim 5 wherein:
first requester-specific code performs the first stall for the first requester using a first stall duration input; and
second requester-specific code performs the second stall for the second requester using a second stall duration input.

7. The method of claim 6 wherein the first and second requester-specific codes carry out the stalls using application program interface calls to override respective arbiter inputs from the first and second requesters.

8. A computer system comprising:
one or more processors which process program instructions;
a memory device connected to said one or more processors; and
program instructions residing in said memory device for verifying an integrated circuit design having arbitration logic which controls access to a shared resource, by generating requests from multiple requesters to the arbitration logic for access to the shared resource during a simulation of operation of the integrated circuit design, selecting at least one of the requesters for an extended stall procedure, and applying a stall having a controlled duration to the selected requester.

9. The computer system of claim 8 wherein the controlled duration is a randomly generated time period within a preset range.

10. The computer system of claim 8 wherein two or more of the requesters are selected for the extended stall procedure including at least a first requestor and a second requestor, and stalls are applied to both the first requestor and the second requester.

11. The computer system of claim 10 wherein a single global counter is used to set a delay between successive stall procedures of selected requesters, and the stalls are applied when the single global counter expires.

12. The computer system of claim 10 wherein a first stall having a first controlled duration is applied to the first requester, and a second stall having a second controlled duration is applied to the second requester, the first and second controlled durations being different.

13. The computer system of claim 10 wherein:
first requester-specific code performs the first stall for the first requester using a first stall duration input; and
second requester-specific code performs the second stall for the second requester using a second stall duration input.

14. The computer system of claim 13 wherein the first and second requester-specific codes carry out the stalls using application program interface calls to override respective arbiter inputs from the first and second requesters.

15. A computer program product comprising:
a computer-readable storage medium; and
program instructions residing in said storage medium for verifying an integrated circuit design having arbitration logic which controls access to a shared resource, by generating requests from multiple requesters to the arbitration logic for access to the shared resource during a simulation of operation of the integrated circuit design, selecting at least one of the requesters for an extended stall procedure, and applying a stall having a controlled duration to the selected requester.

16. The computer program product of claim 15 wherein the controlled duration is a randomly generated time period within a preset range.

17. The computer program product of claim 15 wherein two or more of the requesters are selected for the extended stall procedure including at least a first requestor and a second requestor, and stalls are applied to both the first requestor and the second requester.

18. The computer program product of claim 17 wherein a single global counter is used to set a delay between successive stall procedures of selected requesters, and the stalls are applied when the single global counter expires.

19. The computer program product of claim 17 wherein a first stall having a first controlled duration is applied to the first requester, and a second stall having a second controlled duration is applied to the second requester, the first and second controlled durations being different.

20. The computer program product of claim 17 wherein:
first requester-specific code performs the first stall for the first requester using a first stall duration input; and
second requester-specific code performs the second stall for the second requester using a second stall duration input.

21. The computer program product of claim 20 wherein the first and second requester-specific codes carry out the stalls using application program interface calls to override respective arbiter inputs from the first and second requesters.

22. In an electronic design automation tool for verifying an integrated circuit design having arbitration logic which controls access to a shared resource among a plurality of requesters embodied in a computer-readable storage medium, the improvement comprising:
an arbitration stall simulation mechanism including program instructions residing in said storage medium which, when executed in a computer system, select at least one of the requesters for an extended stall procedure, and apply a stall having a controlled duration to the selected requester, wherein said arbitration stall simulation mechanism is independent of the arbitration logic.

23. The improvement of claim 22 wherein said arbitration stall simulation mechanism selects two or more of the requesters for the extended stall procedure including at least a first requestor and a second requestor, applies a first stall having a first controlled duration to the first requester, and applies a second stall having a second controlled duration to the second requester, the first and second controlled durations being different.

24. The improvement of claim 23 wherein said arbitration stall simulation mechanism includes control code which sets a global counter used to commence successive stall procedures of selected requesters, and includes arbiter input selection which selects the requesters for a next stall procedure based on a predetermined percentage of requesters to stall.

25. The improvement of claim 23 wherein:
first requester-specific code performs the first stall for the first requester using a first stall duration input which sets a first local counter associated with the first requester and using a first application program interface call to override a first arbiter input from the first requester; and
second requester-specific code performs the second stall for the second requester using a second stall duration input which sets a second local counter associated with the second requester and using a second application program interface call to override a second arbiter input from the second requester.

\* \* \* \* \*